United States Patent
Mori

[11] 4,036,551
[45] July 19, 1977

[54] DISPLAY APPARATUS

[75] Inventor: Hiroshi Mori, Tokyo, Japan

[73] Assignee: Sony Corporation, Tokyo, Japan

[21] Appl. No.: 668,974

[22] Filed: Mar. 22, 1976

[30] Foreign Application Priority Data

Mar. 22, 1975  Japan ................................ 50-34697

[51] Int. Cl.² ............................................ G02F 1/16
[52] U.S. Cl. ............................................ 350/160 R
[58] Field of Search ............... 350/160 R, 160 P, 331, 350/194.5 L; 260/240

[56] References Cited
U.S. PATENT DOCUMENTS

| | | | |
|---|---|---|---|
| 3,453,038 | 7/1969 | Kissa et al. ............... | 350/160 R |
| 3,712,709 | 1/1973 | Kenworthy ................ | 350/160 R |
| 3,951,521 | 4/1976 | Findl ........................ | 350/160 R |

*Primary Examiner*—William L. Sikes
*Attorney, Agent, or Firm*—Hill, Gross, Simpson, Van Santen, Steadman, Chiara & Simpson

[57] ABSTRACT

An electronic display apparatus includes a first transparent electrode, a second electrode arranged opposite to the first transparent electrode and an electric-responsive layer containing cyanine dye, interposed between the first transparent electrode and the second electrode. The color tone of the electric-responsive layer changes in response to electric field applied across the first transparent electrode and the second electrode.

11 Claims, 2 Drawing Figures

DISPLAY APPARATUS

BACKGROUND OF THE INVENTION

1. Field of the Invention:

This invention relates to an electronic display apparatus.

2. Description of the Prior Art:

Recently, electronic display apparatus utilizing electrochromism have been developed. The "electrochromism" means the phenomenon that color tone of material is reversibly changed with the application of electric field to the material. And also liquid crystal having an electric field effect is widely known.

For examples, viologen is known as a material exhibiting electrochromism (Appl. Phys. Lett., Vol. 23, No. 2, P. 64). When no electric field is applied to viologen, the viologen is transparent. And when electric field is applied to viologen, the color tone of the viologen changes into blue or purple.

SUMMARY OF THE INVENTION

An object of this invention is to provide a novel electronic display apparatus whose required electric power and response characteristic are nearly equal to those of liquid crystal.

Another object of this invention is to provide an electronic display apparatus in which different color tones can be arbitrarily selected.

A further object of this invention is to provide an electronic display apparatus which can be easily manufactured.

A still further object of this invention is to provide an electronic display apparatus which can be applied to a facsimile telegraphy.

In accordance with an aspect of this invention, an electronic display apparatus includes a first transparent electrode, a second electrode arranged opposite to the first transparent electrode and an electric-responsive layer containing cyanine dye, arranged between the first transparent electrode and the second electrode. In this invention, cyanine dye is used as electrochromic material changing its color tone in response to electric field.

Cyanine dyes constituting an electric-responsive layer according to this invention are represented by the following general formula:

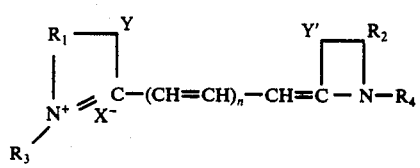

where $R_1$ and $R_2$ represent aromatic group such as benzene or $-CH = CH-$, ($R_3$ and $R_4$ represent alkyl group) Y and Y' represent $-CH = CH-$, $-O-$, $-S-$, $-Se-$ or $=C=(CH_3)_2$, X represents I, Br or Cl, and $n=0$, 1, 2, or 3.

For example, the following cyanine dyes can be used:

(1) Cyanine (Quinoline Blue)
(1,1'-di-iso-amyl-4,4'-cyanine iodide)

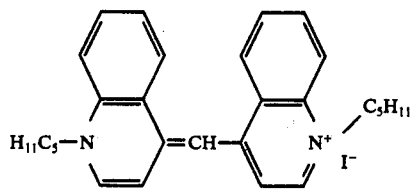

(2) Pseudocyanine (2,2'-Cyanine)

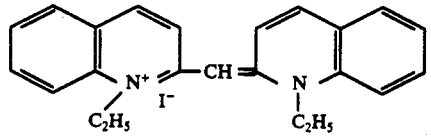

(3) Pinacyanol (2,2'-Carbocyanine)

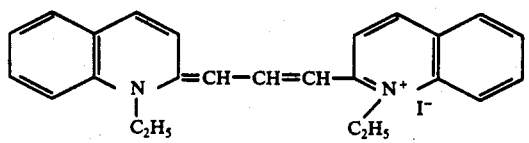

(4) Kryptocyanine (4,4'-Carbocyanine)

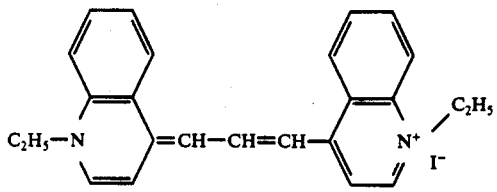

-continued (5) Dicyanine (2',4-Dimethyl-2,4'-carbocyanine)

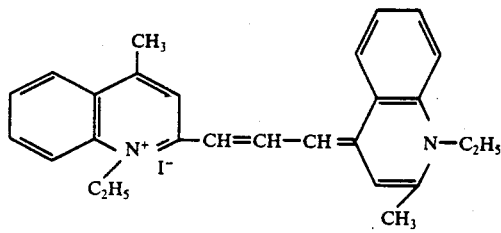

(6) 4,4'-Dicarbocyanine (1,1'-Diethyl-4,4'-dicarbocyanine iodide)

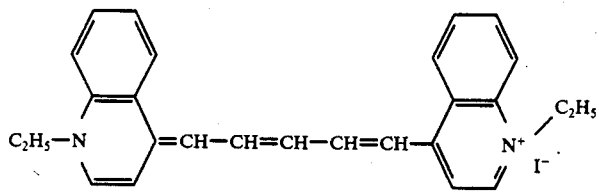

(7) Xenocyanine

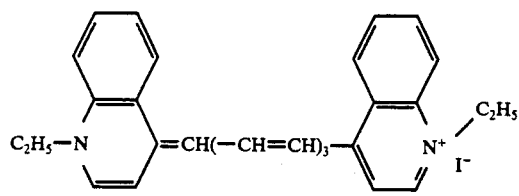

(8) Indo-tricarbocyanine

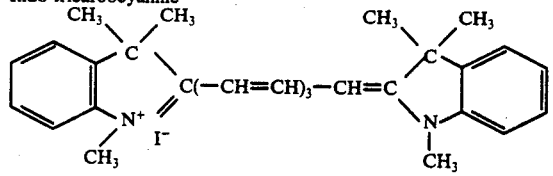

In use, the above-described cyanine dyes are dissolved into a solvent such as alcohol, acetone or water. Moreover, electrolyte such as LiCl may be added to the cyanine dyes solution to raise its electric conductivity. The concentration of cyanine dyes in the solution may be several tens milligrams/20cc (about 0.1 gram equivalent). The lower the concentration, the more striking the contrast. An electric-responsive layer according to this invention may comprise a mixture of a cyanine dye and an electron acceptor such as tetracyanoethylene, picric acid or tetracyanoquinodimethane. Or it may comprises two or more kinds of cyanine dyes.

Alcohol is a preferably solvent, since it is superior in electric conductivity. However, a mixture of alcohol and benzene, toluene, dioxane or chloroform may be used as a solvent.

The electric-responsive layer is arranged between a first transparent electrode of tin oxide ($SnO_2$) or indium oxide ($In_2O_3$) and a second transparent electrode of the above-described material or a second electrode of aluminum. The color tone of the electric-responsive layer changes in response to the DC voltage applied to the electrodes. Thus, the desired display is effected. In such a case, it is considered that oxidation-reduction reaction occurs in the electric responsive layer. When the DC voltage is shut off from the electrodes, the color tone of the electric-responsive layer changes into its original color tone after a long time. However, when the DC voltage is reversely applied to the electrodes, the color tone of the electric-responsive layer changes into its original color tone after a very short time. Accordingly, the display can be frequently repeated. The level of the DC voltage to be applied or the required current intensity depends on the used solvent and the distance between the electrodes. The shorter the distance between the electrodes, the more striking the contrast. It is preferable that the distance between the electrodes is 50 to 100 $\mu$m. Although the level of the DC voltage to be applied scarcely depends on the cyanine dye material of the electric-responsive layer, it is preferable that it is several volts to about twenty volts. When the applied DC voltage is lower than several volts, the current intensity is less than 1mA, and it scarcely depends on the material of the solvent. However, the response of the electric-responsive layer is undesirable. When the applied DC voltage is higher than 10 volts, the current intensity is the maximum in use of water as a solvent. However, when the applied DC voltage is too high, there is the possibility that the electrodes are decomposed and eroded.

DESCRIPTION OF THE PREFERRED EMBODIMENTS

Figure 1:
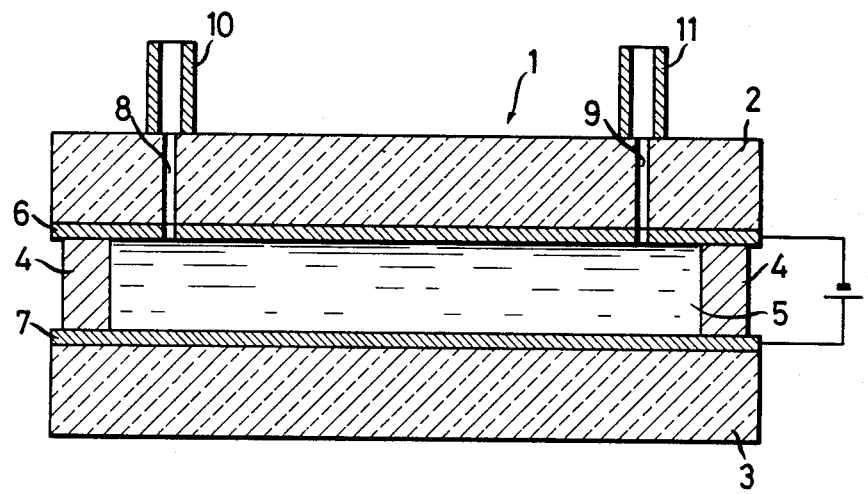
FIG. 1 is a cross-sectional view of an electronic display apparatus according to this invention.

An electronic display apparatus according to this invention will be described with reference to FIG. 1 and FIG. 2.

In an electronic display apparatus 1, two glass plates 2 and 3 are combined with each other through a spacer 4. The distance between the two glass plates 2 and 3 is about 70 μm. Transparent electrodes 6 and 7 are attached to the inner surfaces of the glass plates 2 and 3, respectively. A chamber formed by the transparent electrodes 6 and 7, the glass plates 2 and 3, and the spacer 4 is filled with an electric-responsive solution 5 which consists of cyanine dye dissolved into a solvent, and an electrolyte. A DC voltage of 5 to 20 volts is applied across the electrodes 6 and 7.

Piercing holes 8 and 9 are made in the glass plate 2 and the electrode 6. And supply tubes 10 and 11 are connected to the holes 8 and 9, respectively. The electric-responsive solution 5 is supplied into the chamber of the electronic display apparatus 1 through the supply tubes 10 and 11, and the holes 8 and 9. After the chamber is filled with the electric-responsive solution 5, the supply tubes 10 and 11 are closed. The viscosity of the solution 5 is very low in comparison with that of a liquid crystal. Accordingly, the solution 5 can be very easily supplied into the chamber through the supply tubes 10 and 11, and the holes 8 and 9. The manufacturing process is very simple. The required electric power of the electronic display apparatus 1 is comparable with that of the liquid crystal.

Figure 2:
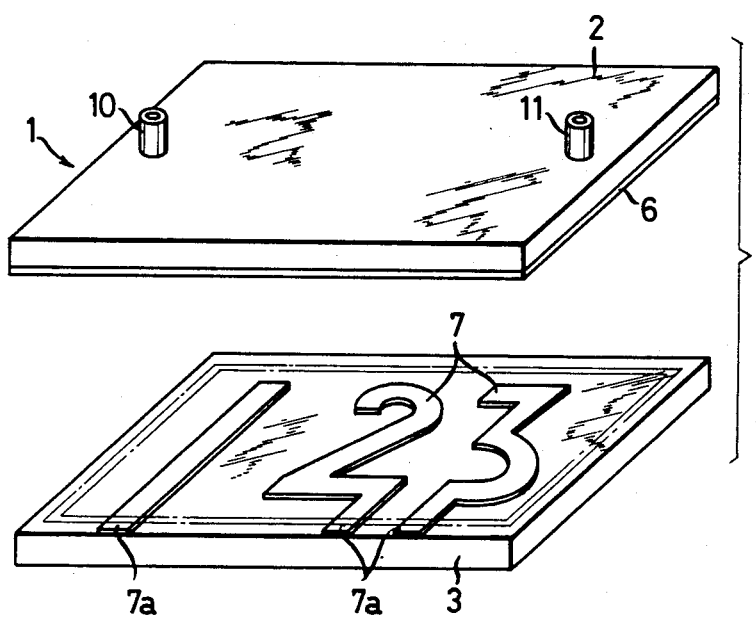
FIG. 2 is a perspective exploded view of a part of the electronic display apparatus of FIG. 1.

FIG. 2 shows a perspective exploded view of the two glass plates 2 and 3. The electrode 7 attached to the glass plate 3 is in the shape of figures. Ends 7a of the figures are used as terminals. When the DC voltage is applied to the terminals 7a, the corresponding figures are displayed. In the glass plate 3, the position of the spacer 4 is shown by the dot-dash line on FIG. 2.

Since the change of the color tone is observed from above the glass plate 2, it is required that the electrode 6 is transparent, but it is not always required that the electrode 7 is transparent.

This invention is not limited to the abovedescribed display apparatus 1 as a display tube, but it may be applied to a sheet for facsimile. In the manufacture of the sheet for facsimile, cyanine dye according to this invention is dissolved into a polymer and the produced solution is hardened with gelatine. And a polyethylene sheet is coated with the hardened liquid. In such a case, an electric-responsive layer is selected which is maintained in changed color tone for a long time.

Next, different embodiments according to this invention will be described. It will be understood that this invention is not limited to these embodiments but variations are possible on the basis of the technical concept of this invention.

In order to obtain an electric-responsive layer, cyanine (quinoline blue) $C_{29}H_{35}IN_2 \cdot 0.5H_2O$ having the following constitutional formula is dissolved into methanol:

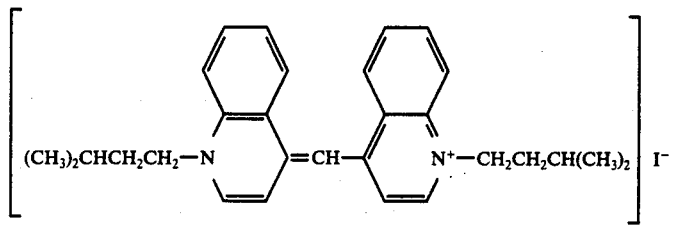

The above material functions as an acid-base indicator at PH=6.6 ~ 8.6. It is colorless for acid, and is blue for base. It has paraquinone as chromophore. When electric field is applied, electrons are imparted to the above material. It is supposed that the materials having the following constitutional formulas are produced in the electric-responsive layer:

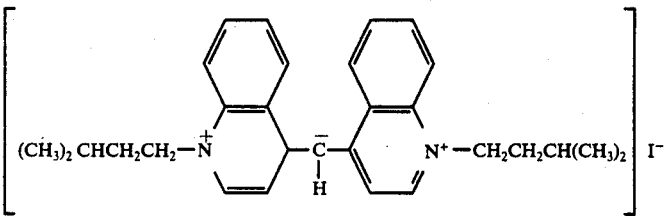

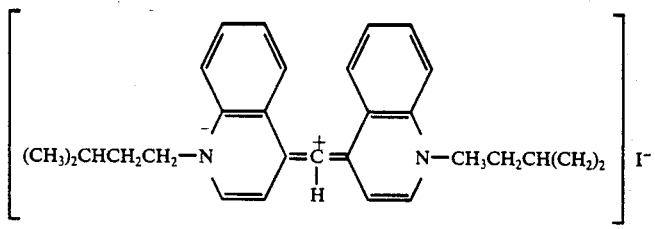

The concentration of quinoline in the electric-responsive layer is low as several tens milligrams/20 cc.

The color tone of the above-described electric-responsive layer changes as follows:

Blue ⇌ Colorless (transparent)

When the DC voltage is applied to the electrodes, the electric-responsive layer becomes colorless only along the lines of electric force between the upper electrode and the lower electrode to which the DC voltage is applied. And when the DC voltage is shut off, the electric-responsive layer soon becomes again blue, namely is original color. The contrast and the response are satisfactory. When the DC voltage is reversely applied to the electrodes, the electric-responsive layer instantaneously becomes blue and again becomes transparent.

The relationship between the applied DC voltage and the current density is as follows:

| | |
|---|---|
| 5V | 1.1 – 1.2 mA/cm² |
| 10V | 2.0 – 3.0 mA/cm² |
| 15V | 3.0 – 4.0 mA/cm² |
| 20V | 5.0 – 6.0 mA/cm² |

It is preferable that the applied DC voltage is higher than 10V. The fact that the electric-responsive layer becomes colorless (transparent) is supposed to be caused by either of the two materials having the above constitutional formulas produced when the DC voltage is applied to the electrodes.

Next, the color tone of the electric-responsive layer of higher concentration of cyanine dye changes as follows:

Blue ⇌ Light blue ⇌ Red

With the application of the DC voltage, the electric-responsive layer first becomes light blue. And with the raise of the applied DC voltage, it further becomes red. When the light blue electric-responsive layer is let alone for a long time, the electric-responsive layer again becomes blue, namely its orginal color. When the DC voltage is shut off in the condition that the electric-responsive layer is red, the electric-responsive layer turns back to light blue. Accordingly, the display can be repeated between light blue and red. When the DC voltage is reversely applied to the electrodes, the electric-responsive layer instantaneously turns back to blue, namely to its original color tone, and then becomes colorless (transparent). The relationship between the applied DC voltage and the current density is as follows:

| | |
|---|---|
| 5V | 1.1 – 1.2 mA/cm² |
| 10V | 2.0 – 3.0 mA/cm² |
| 15V | 3.0 – 4.0 mA/cm² |
| 20V | 5.0 – 6.0 mA/cm² |

Next, a few drops of HCl solution are added to the above-described electric-responsive layer. The change of the color tone is tested. The test results are as follows:

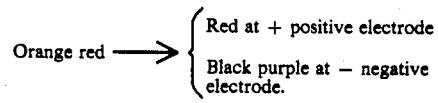

The original color of the electric-responsive layer varies with the distance between the electrodes. The contrast is striking at the small distance. For example, th original color is colorless at the distance of 50 μm. With the addition of such electrolyte, the color tone of the electric-responsive layer changes along the electrodes. In such a case, the relationship between the applied DC voltage and the current density is as follows:

| | |
|---|---|
| 5V | 1.5 mA/cm² |
| 10V | 3.0 mA/cm² |
| 15V | 6.0 – 7.0 mA/cm² |

What is claimed is:
1. A display apparatus comprising:
a. a first transparent electrode;
b. a second electrode arranged opposite to said first transparent electrode; and
c. an electric-responsive layer containing cyanine dye, interposed between said first transparent electrode and said second electrode, said cyanine dye being represented by the following general formula:

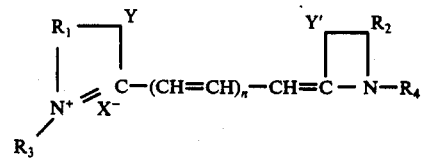

where $R_1$ and $R_2$ represent aromatic group or —CH=CH—, $R_3$ and $R_4$ represent alkyl group, Y and Y' represent —CH=CH—, —O—, —S—, —Se— or =C=(CH$_3$)$_2$, X represents I, Br or Cl, and $n=0, 1, 2$ or 3.

2. A display apparatus according to claim 1, in which said cyanine dye is one selected from the group consisting of quinoline blue, pseudocyanine, pinacyanol, kryptocyanine, dicyanine, 4,4'-dicarbocyanine, xenocyanine and indo-tricarbocyanine.

3. A display apparatus according to claim 1, in which said cyanine dye is a mixture of two or more selected from the group consisting of quinoline blue, pseudocyanine, pinacyanol, kryptocyanine, dicyanine, 4,4'-dicarbocyanine, xenocyanine and indo-tricarbocyanine.

4. A display apparatus according to claim 1, in which said cyanine dye is quinoline blue.

5. A display apparatus according to claim 1, in which said cyanine dye is dissolvd into a solvent selected from the group consisting of alcohol, acetone and water or into a mixture of said solvent and another solvent selected from the group consisting of benzene toluene, dioxane and chloroform.

6. A display apparatus according to claim 5, in which electrolyte is further added into said cyanine dye.

7. A disply apparatus according to claim 1, in which said electric-responsive layer comprises a mixture of said cyanaine dye and an electron acceptor.

8. A display apparatus according to claim 7, in which said electron acceptor is one selected from the group consisting of tetracyanoethylene, picric acid and tetracyanoquinodimethane.

9. A display apparatus according to claim 1, in which a DC voltage of several volts to 20 volts is applied across said first and second electrodes.

10. A display apparatus according to claim 1, in which the distance between said first and second electrodes is 50 to 100 $\mu$m.

11. A display apparatus according to claim 9, in which said DC voltage is reversibly applied across said first and second electrodes.

* * * * *